April 17, 1934.     T. H. PEARSON     1,955,652
ELECTRIC CORD SWIVEL CONNECTER
Filed Nov. 11, 1931
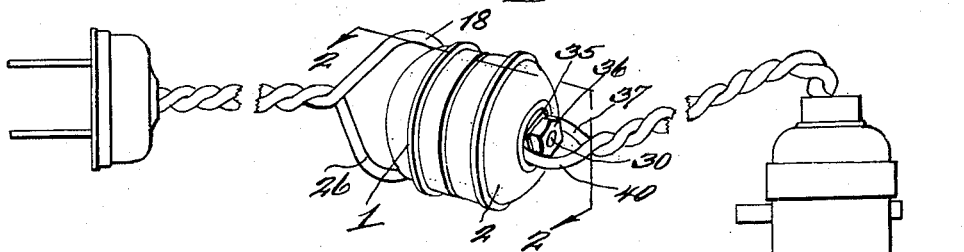
Thomas H. Pearson, INVENTOR
BY Victor J. Evans
ATTORNEYS Patented Apr. 17, 1934

1,955,652

UNITED STATES PATENT OFFICE 1,955,652

ELECTRIC CORD SWIVEL CONNECTER

Thomas H. Pearson, Philadelphia, Pa.

Application November 11, 1931, Serial No. 574,414

1 Claim. (Cl. 173—324)

The invention relates to an improved ball bearing swivel connecter for various electric cords, such as used on telephones, lamps, electric sad irons and various other articles, where the cord is apt to get very much twisted or entangled, and the purpose of the connecter is to permit the cord to move freely in all directions, that is turn and not become entangled.

Another purpose is to provide an electric cord ball bearing swivel connecter, so interiorly constructed as to permit the current to pass through the ball bearings in order to complete the circuit, and also in such wise as to prevent any static, which in many instances is due to loose connections. A ball bearing swivel connecter of this kind would be very useful in connection with electric cords used in connection with radio apparatus, especially an all electric radio receiving set, enabling it to be moved from place to place without entangling the various cords, especially those which are plugged into sockets.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view in perspective illustrating a connecter in a cord connecting between a plug and an electric lamp bulb.

Figure 2 is a sectional view on line 2—2 of Figure 1.

Figure 3 is a similar view showing the connecter in section, but constructed for use to plug in to female parts of a conventional type of screw plug.

Referring to the drawing 1 and 2 identifies the two sections of the shell or housing for the connecting parts of the swivel. These two sections are constructed of any suitable insulating material, not only to insure against short circuiting, but also to permit the connecter to be manually handled.

Secured in the section 1 of the shell frictionally as identified at 3 are two ball bearing units 4 and 5. The units consist of the inner hubs or rings 6 and 7 and the outer rings 8 and 9, with intermediate rings 10 and 11. The intermediate rings 10 and 11 have pockets or cavities 12 for the reception of the ball bearings proper 13 and 14. The ball bearing units are of the conventional type, such as can be bought off the open market, and the outer rings 8 and 9 are capable of movement relative to the ball bearings. The outer ring 9 of the ball bearing unit 4 is frictionally held in any suitable manner as identified at 3 in the section 1 of the shell, so that the outer ring 9 is immovable relative to the section 1. An insulating ring 15 is located between the outer rings 8 and 9 of the units.

The section 2 of the connecter has a shoulder 16, against which an insulating disc 17 engages.

One wire 18 is secured to a binding screw 20 which passes through the insulating disc 17, the binding screw in turn having a conducting head 21, which at all times engages with the metal ring couple 22. This couple 22 engages with an insulating disc 23. An insulating thimble or sleeve 24 engages through the inner ring or hub 6, the flange 25 of which being intermediate the two inner rings or hubs 6 and 7. A second wire 26 passes through the section 2 of the shell and is connected to a binding screw 27. The binding screw 27 is carried by the disc 17. Also clamped against the disc 17 by one of the nuts 28 on the binding screw 27 is an arm or plate 29, which is in conductivity with a holding pin 30 for the various parts of the connecter. A nut 31 is threaded on the holding pin 30 in order to retain the plate or arm 29 in contact with the pin 30. The section 2 of the shell of the connecter has a central opening 32, which is internally flanged as shown and a washer 33 engages with the flange of the central opening. A nut 34 is threaded to the pin 30 and retains the washer 33 in the opening. A washer 35 engages the other end of the pin 30, and also a nut 36 is threaded upon the pin 30 against the washer 35. By means of the pin 30 and the nuts 34 and 36 the various parts of the swivel connecter are held together.

A wire or lead 37 passes through an opening 38 in the section 1 of the shell, and is connected as identified at 39 by solder or the like to the outer ring 8 of one of the ball bearing units, while another wire or lead 40 engages through an opening 41 in the section 1 of the shell and is secured in any suitable manner as identified at 42 to the outer ring 9 of the other ball bearing unit.

As shown in Figure 3 plug in blades 43 and 44 pass through the section 2 of the shell and have reduced threaded ends passing through the disc 17 and provided with nuts 45 to hold them in position. The plug-in blade 44 connects at 46 to the conducting head 21, while the plug-in blade 43 electrically connects with the plate or arm 29. The plug-in blades 43 and 44 may engage female sockets 47 of a conventional type of plug 48, or engage in similar female sockets (not shown) as may be positioned in a wall or base board. In this manner there are two types of swivel connecters disclosed.

The manner in which the sections 2 and 3 of the connecter are shown in section, it is convenient to trace out the circuit, it being obvious that the outer rings 8 and 9 rotate around the ball bearings, allowing the two sections 1 and 2 of the shell to freely swivel relative to each other.

The invention having been set forth, what is claimed is:

As an article of manufacture, a swivel connecter for electric cords, consisting of a shell including two sections adapted for swivel movement, a pair of ball bearing units comprising two sets of inner and outer rings with ball bearings between the rings of each set, the rings of each set being concentric, those of one set being axial with those of the other set, the outer rings being housed within and movable with one section of the shell, whereby the outer rings may rotate around the ball bearings, allowing the two shell sections to freely swivel relative to each other, a support within and carried by the other shell section, means comprising a screw rod passing axially through the support and having removable nuts threaded on the opposite ends of the rod for clamping the inner rings to the support, said rod being movable with said other shell section, the remote walls of the two shell sections having openings exposing the nuts and permitting access thereto for disassembling the connecter, the inner and outer rings of one ball bearing unit being insulated from those of the outer ball bearing unit, said support being constructed of insulating material, a conductor carried by the support and in circuit with one unit which carries an outgoing lead for the circuit, a second conductor carried by said support and having an outgoing lead, said second conductor being in circuit with said clamping means which is in turn in circuit with the other unit, the outer ring of which has an outgoing lead, thereby completing an electric circuit through the electric cord.

THOMAS H. PEARSON.